United States Patent
Tychon et al.

(10) Patent No.: US 8,170,022 B2
(45) Date of Patent: May 1, 2012

(54) METHOD AND APPARATUS FOR ACTIVELY DISCOVERING INTERNET PROTOCOL EQUAL COST MULTIPLE PATHS AND ASSOCIATE METRICS

(75) Inventors: Emmanuel P. Tychon, Fexhe-le-Haut-Clocher (BE); Benoit Claise, Crisnee (BE); Stefano Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 446 days.

(21) Appl. No.: 11/456,467

(22) Filed: Jul. 10, 2006

(65) Prior Publication Data
US 2008/0008178 A1 Jan. 10, 2008

(51) Int. Cl.
*H04L 12/56* (2006.01)
(52) U.S. Cl. .................. 370/392; 370/400
(58) Field of Classification Search ............ None
See application file for complete search history.

(56) References Cited

U.S. PATENT DOCUMENTS

| | | | |
|---|---|---|---|
| 5,781,534 A * | 7/1998 | Perlman et al. | 370/248 |
| 6,545,979 B1 * | 4/2003 | Poulin | 370/241.1 |
| 6,662,223 B1 | 12/2003 | Zhang et al. | |
| 6,868,094 B1 * | 3/2005 | Bordonaro et al. | 370/516 |
| 7,269,157 B2 * | 9/2007 | Klinker et al. | 370/351 |
| 2002/0097724 A1 * | 7/2002 | Halme et al. | 370/392 |
| 2002/0145981 A1 * | 10/2002 | Klinker et al. | 370/244 |
| 2002/0153998 A1 * | 10/2002 | Litwin et al. | 340/310.01 |
| 2003/0086422 A1 * | 5/2003 | Klinker et al. | 370/389 |
| 2006/0104217 A1 * | 5/2006 | Lehane | 370/252 |

* cited by examiner

*Primary Examiner* — Chirag Shah
*Assistant Examiner* — Steve Young
(74) *Attorney, Agent, or Firm* — P. Su

(57) ABSTRACT

Methods and apparatus for identifying a best path from a plurality of equal cost paths while accounting for service level agreement (SLA) metrics are disclosed. According to one aspect of the present invention, a method for routing a packet that has a payload using a node includes obtaining the packet, and adding an address of the node to the payload. Adding the address of the node to the payload creates an augmented packet. The method also includes identifying at least one element to which the augmented packet is to be routed, and providing the augmented packet to that element. In one embodiment, the method also includes storing ingress and egress timestamps associated with the node.

12 Claims, 9 Drawing Sheets

METHOD AND APPARATUS FOR ACTIVELY DISCOVERING INTERNET PROTOCOL EQUAL COST MULTIPLE PATHS AND ASSOCIATE METRICS

BACKGROUND OF THE INVENTION

1. Field of Invention

The present invention relates generally to internet protocol (IP) equal cost multiple paths. More particularly, the present invention relates to utilizing payloads of packets to indicate nodes traversed by each of a plurality of equal cost paths between a source point and a destination point such that the route taken by each equal cost path may be ascertained by the destination point.

2. Description of the Related Art

Equal cost multi-path (ECMP) is an Internet Protocol (IP) routing technique that is used to direct packets along multiple paths of equal cost. Equal cost paths are generally paths that traverse the same number of hops, but the identification of equal cost paths may depend upon other parameters, e.g., bandwidth. Some routing protocols effectively measure the cost of a path by counting the number of traversed hops. However, other metrics may be use in order to compute the cost of paths. Metrics may include numerical values assigned to each link that a path traverses such that the cost of the path is the sum of the cost of substantially all links belonging to the path. In ECMP, a router generally determines which equal cost path to use to route a packet from a source to a destination using a typically non-predictable load-balancing mechanism.

FIG. 1A is a diagrammatic representation of a core network with a plurality of equal cost paths between a source and a destination. In a network 100 between a source 104 and a destination 108, there may be any number of equal cost paths. By way of example, network 100 includes four paths which have equal costs. A first path traverses nodes 112*a*, 112*b*, 112*d*, a second path traverses nodes 112*a*, 112*c*, 112*d*, a third path traverses nodes 112*e*, 112*f*, 112*g*, and a fourth path traverses nodes 112*e*, 112*f*, 12*h*.

Typically, when source 104 sends a packet to destination 108, the packet may be sent on any path. The selection of an appropriate path may be made based on factors such as load balancing. Further, destination 108 may not necessarily be aware which path the packet is received on, and may only be aware of the final node 112*d*, 112*g*, or 112*h* the packet is received from. As shown in FIG. 1B, destination 108 receives a packet 120 that is transmitted from source 104, and destination 108 may be unaware of which equal cost path is actually traversed by packet 120.

As previously mentioned, the selection of an equal cost path from among a plurality of equal cost paths for use in transmitting packets from a source to a destination may be based on load balancing requirements. Metrics such as a per-destination or a per-packet metric may be used to balance the load on equal cost paths.

A service level agreement (SLA) may be made between a subscriber and a service provider to specify a particular level of service to be provided by the service provider to the subscriber. Any violation of conditions of an SLA may lead to inconvenience or worse for a subscriber. An SLA may use metrics that involve network characteristics that may be used to specify an acceptable level of service. Such network characteristics may include, but are not limited to, jitter, packet loss, and delays. Jitter, packet loss, and delays may be different for different equal cost paths. Typically, the selection of an equal cost path does not account for network characteristics. As the jitter, packet loss, and delays associated with each equal cost path may vary greatly, the selection of some equal cost paths based primarily or completely on load balancing requirements may result in a violation of an SLA.

Therefore, what is needed is a method and an apparatus which allows each equal cost path of a plurality of equal cost paths to be characterized in terms of SLA metrics such that the selection of an equal cost path for use to transmit packets may account for an SLA. That is, what is desired is a system that efficiently allows different equal costs paths between a given source and a given destination to be identified and characterized in terms of network characteristics such as jitter, packet loss, and delay.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1A:
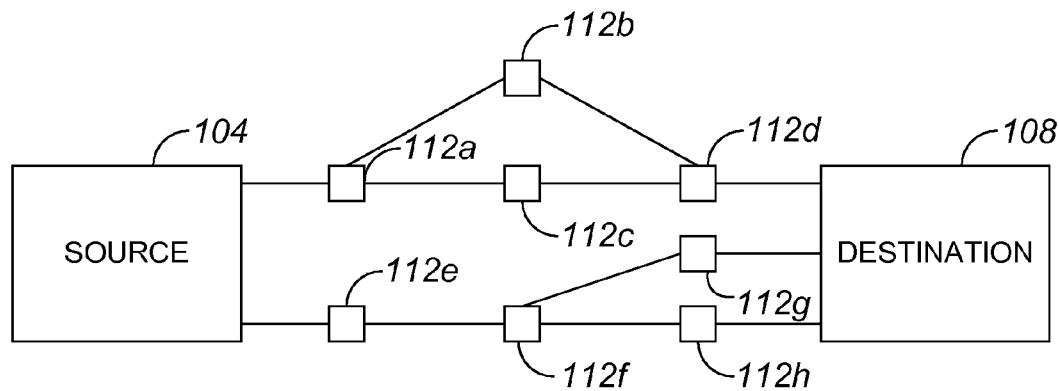
FIG. 1A is a diagrammatic representation of a core network with a plurality of equal cost paths between a source and a destination.
Figure 1B:
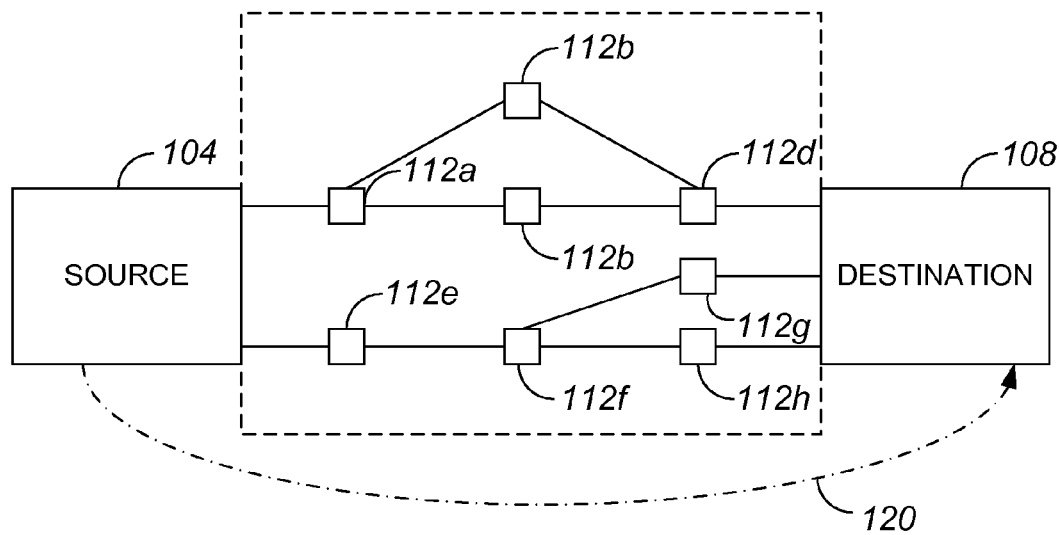
FIG. 1B is a diagrammatic representation of a core network, i.e., core network 100 of FIG. 1A, in which a packet is sent from a source to a destination.

When an Internet Protocol (IP) network utilizes an equal cost multi-path (ECMP) capable routing protocol, a load-balancing mechanism is generally used to determine which equal cost path of a plurality of equal cost paths to use in routing packets. Although a particular equal cost path may be appropriate for use from a load-balancing point-of-view, the particular equal cost path may be subjected to delays and/or jitter as well as packet loss that may render the particular equal cost path to be less desirable than another equal cost path from an IP service level agreement (SLA) standpoint.

Network characteristics such as delays and jitter associated with a link traversed by a packet may generally be identified by determining how long a packet remains at each node or hop traversed by the packet. By providing information in a packet that indicates how long the packet remains at each node in a path, it may readily be ascertained whether the path meets a particular SLA. Hence, an equal cost path of a plurality of equal cost paths that fails to meet a particular SLA may be prevented from being used, even if the equal cost path is efficient from a load balancing standpoint.

Each equal cost path between a source and a destination may be traversed by a probe packet such that the destination receives a number of probe packets that corresponds to approximately a total number of equal cost paths between the source and the destination. Typically, the number of probe packets received at a destination may correspond to the total number of equal costs paths. By way of example, if there are four equal cost paths between a source and a destination, regardless of how many probe packets are initially initiated by the source, due to potentially replicating a probe packet at an intermediate hop which has two associated next hops, the destination receives four probe packets. Hence, if information pertaining to the equal cost path traversed by a probe packet is provided in the probe packet, the destination that receives the probe packet may compare the information to information obtained for other equal cost paths to determine the best equal cost path for use in sending packets from a source to the destination.

By providing information relating to the amount of time a probe packet remains at each hop, network characteristics such as jitter and delays may be determined for the path traversed by the probe packet. In other words, network characteristics associated with a SLA may be determined for the path. For example, by timestamping a packet as the packet leaves one hop and timestamping the packet again when the packet arrives at another hop, a delay and jitter associated with a link between the hops may be determined. Further, by providing information that identifies each hop traversed by the probe packet, the path traversed by the probe packet may be readily identified in addition to network characteristics associated with the path. Network characteristics may be determined actively in that the network characteristics are determined substantially any time an equal cost path is to be selected from among a plurality of equal cost paths. Hence, information relating to network characteristics is effectively up-to-date.

Information that may be used to determine jitter and delays, as well as information that identifies each hop traversed by a probe packet, may be stored in the probe packet. Packet loss may be determined by sending multiple packets that contain a sequence number in their associated payloads. Additionally, packet loss information may be collected at each hop from a local statistics database associated with the hop. As a number of packets that is sent by a first node to a second node is known, the second node may determine how many packets were lost during transmission from the first node. In one embodiment, timestamps and addresses, e.g., IP addresses, are stored by each hop traversed by a probe packet in the payload of the probe packet. The ability to add timestamps and addresses to the payload of a probe packet may be provided by a responder functionality block of each node in a path.

Figure 2:
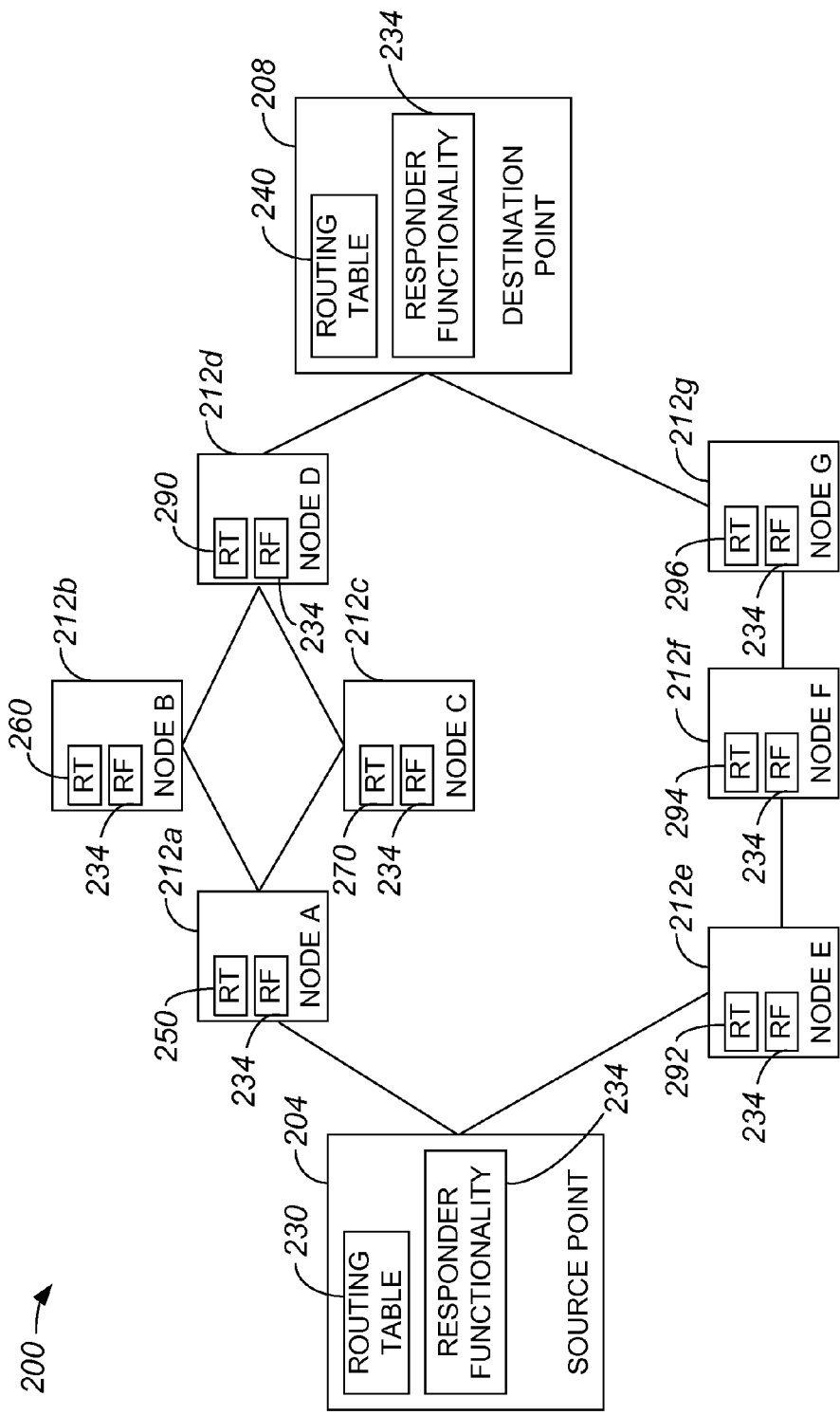
FIG. 2 is a diagrammatic representation of a core network in which nodes between a source point and a destination point in which each of the nodes has responder functionality in accordance with an embodiment of the present invention.

FIG. 2 is a diagrammatic representation of a network in which each node has responder functionality in accordance with an embodiment of the present invention. A network 200 includes a source point 204, which is a node that is arranged to initiate a probe packet and a destination point 208, which is a node that is arranged to be the target of the probe packet. In one embodiment, network 200 is a service provider network and is protected by a firewall (not shown). Source point 204, destination point 208, and nodes 212a-g each include a responder functionality block 234.

Responder functionality block 234 provides functionality that allows a node on which it is included, e.g., a source point 204, to augment probe packets. Augmenting a probe packet generally includes updating a payload of the probe packet to contain information associated with a node. By way of example, responder functionality block 234 included on source point 204 enables information associated with source point 204 to be added or otherwise provided to the payload of the probe packet. Such information includes, but is not limited to, an address associated with a node, timestamps associated with transmitting and/or receiving a probe packet, and interface characteristics associated with the node. It should be appreciated that information that is not necessarily associated with a node, e.g., a time-to-live (TTL) value, may be added to the probe packet by responder functionality block 234.

Routing table 230, which is included on source point 204, provides routing information that may be used by source point 234 to identify hops in a path to destination point 208 or substantially any other paths within network 200. As shown, there are three equal cost paths. A first equal cost path traverses nodes 212a, 212b, 212d, while a second equal cost path traverses nodes 212a, 212c, 212d. Finally, a third equal cost path traverses nodes 212e-g. It should be appreciated that although three equal cost paths are shown, network 200 may generally include any number of equal cost paths.

When source point 204 transmits a packet to destination point 208, the hops or nodes 212a-g traversed by the packet may be determined using routing table 230. In the embodiment as shown, source point 204 may determine through routing table that there are equal cost paths to destination point, and that the first hops in the equal cost paths involve either node 212a or node 212e. Hence, source point 204 transmits the probe packet to both node 212a and node 212e. Node 212a and node 212e augment their probe packets, and using routing table 250a and routing table 292, node 212a and node 212e, respectively, identify next hops of equal cost paths over which to transmit an augmented probe packet.

Node 212a identifies next hops to be nodes 212b and 212c. Each of these nodes 212b and 212c, upon receiving and augmenting a probe packet, uses its respective routing tables 260 and 270, respectively, to identify the next hop which, as shown, is node 212d. Node 212d then augments the probe packets received from nodes 212b and 212c, identifies destination point 208 as the next hop using a routing table 290, and provides the probe packets to destination point 240. Destination point 208, which may include a routing table 240, may use responder functionality block 234 to identify which probe packet is received on a best path.

Node 212e uses a routing table 292 to identify a next hop in an equal cost path to be node 212f. In turn, node 212f uses a routing table 294 to identify node 212g as a next hop. Finally, node 212g uses a routing table 296 to identify destination point 208 as the next hop in the equal cost multiple path that passes through node 212e.

Figure 3:
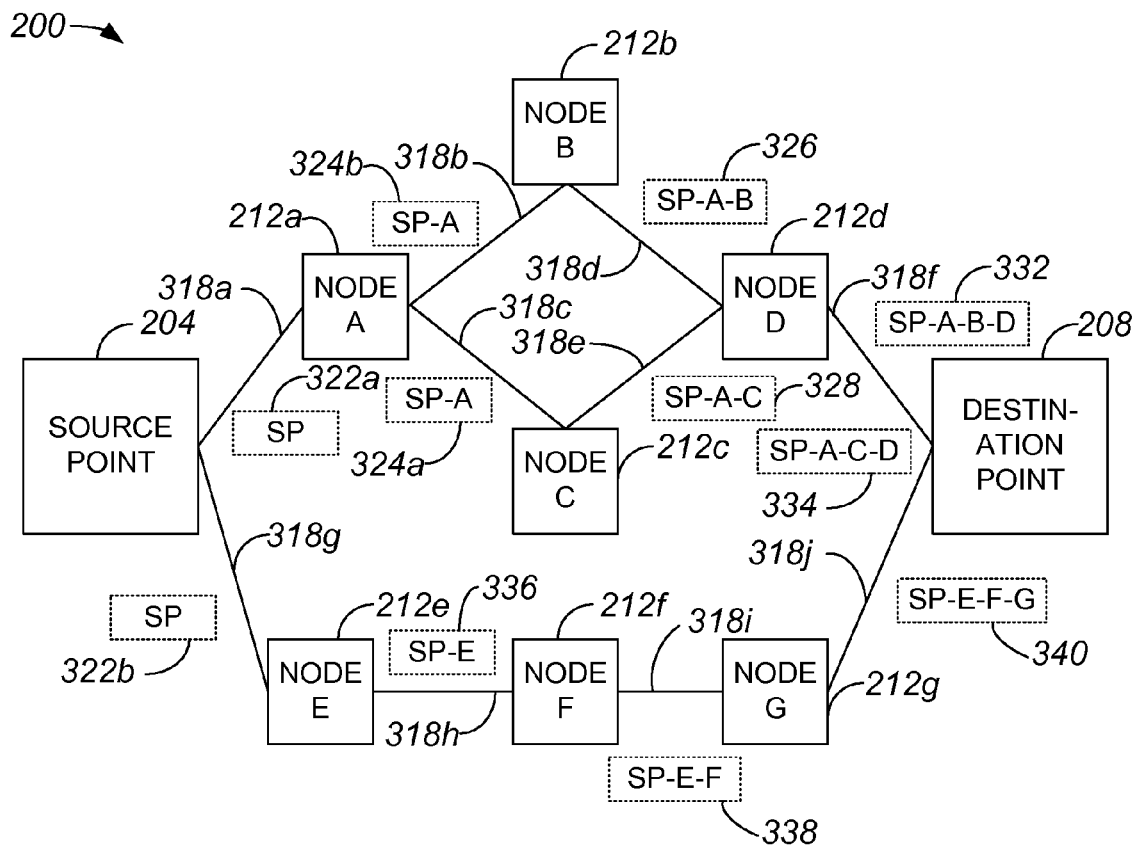
FIG. 3 is a diagrammatic representation of a core network, i.e., core network 200 of FIG. 2, in which a payload of a packet is augmented by each node in accordance with an embodiment of the present invention.

Augmenting a probe packet using responder functionality block 234 may include source point 204 each node 212a-g adding its address to a payload of the probe packet. Each added address may be an IP address, although it should be appreciated that other types of addresses or identifying information may instead be added to the payload of a probe packet. With reference to FIG. 3, the generation of probe packets that include an address of each node 212a-g of equal cost paths traversed by the probe packets will be described in accordance with an embodiment of the present invention. Within network 200, source point 204 initiates probe packets 322a, 322b on each equal cost path between source point 204 and destination point 208. Probe packet 322a, which includes a payload that identifies an address SP associated with source point 204, is sent on a transmissions segment 318a, e.g., a link, to node 212a. Probe packet 322b, which also includes a payload that identifies an address SP associated with source point 204, is transmitted on a transmissions segment 318g to node 212e.

Node 212a effectively augments probe packet 322a, and sends augmented probe packets 324a, 324b on transmissions segments 318b, 318c, respectively. Augmented probe packets 324a, 324b have payloads that specify address SP and an address associated with node 212a, i.e., address A. When node 212b receives augmented probe packet 324b, node 212b generates augmented probe packet 326 which includes address B of node 212b, in addition to address SP and address A. Similarly, node 212c generates augmented probe packet 328 to include address C of node 212c, in addition to address SP and address A, when augmented probe packet 324a is received.

Both augmented probe packet 326 and augmented probe packet 328 are provided to node 212d. Augmented probe packet 326 is provided on transmissions segment 318d, and augmented probe packet 318e is provided on transmissions segment 318e. When node 212d receives both augmented probe packet 326 and augmented probe packet 328, node 212d adds its associated address D to generate augmented probe packet 332 and augmented probe packet 334, respectively, which are provided to destination point 208 via transmissions segment 318f. Augmented probe packet 332 includes address SP, address A, address B, and address D. Augmented probe packet 334 includes address SP, address A, address C, and address D.

When node 212e receives probe packet 322b, node 212e creates augmented probe packet 336 by adding its associated address E, and provides packet 336 to node 212f on transmissions segment 318h. Augmented probe packet 338, which includes address SP, address E, and address F which is associated with node 212f, is provided on transmissions segment 318i to node 212g. Finally, node 212g forwards augmented packet 340, which includes address SP, address E, address F, and address G which is associated with node 212g. Destination point 208 receives packet 340 on transmissions segment 318j.

Once destination point 208 receives packets 332, 334, 340 or, more generally, once destination point 208 receives a probe packet on a plurality of equal cost paths between source point 204 and destination point 208, destination point 208 may determine which equal cost path is the best equal cost path to use. Such a determination may be made based on the information stored in the payload of packets 332, 334, 340. Further, the actual equal cost path that is determined to be the best equal cost path for a given situation may be readily identified, as addresses for the nodes included in each equal cost path are stored in the payload of each packet 332, 334, 340. Typically, when destination point 208 effectively determines which equal cost path is a best path, destination point 208 provides information to source point 204 which may then select the best path as the path to use.

Figure 4:
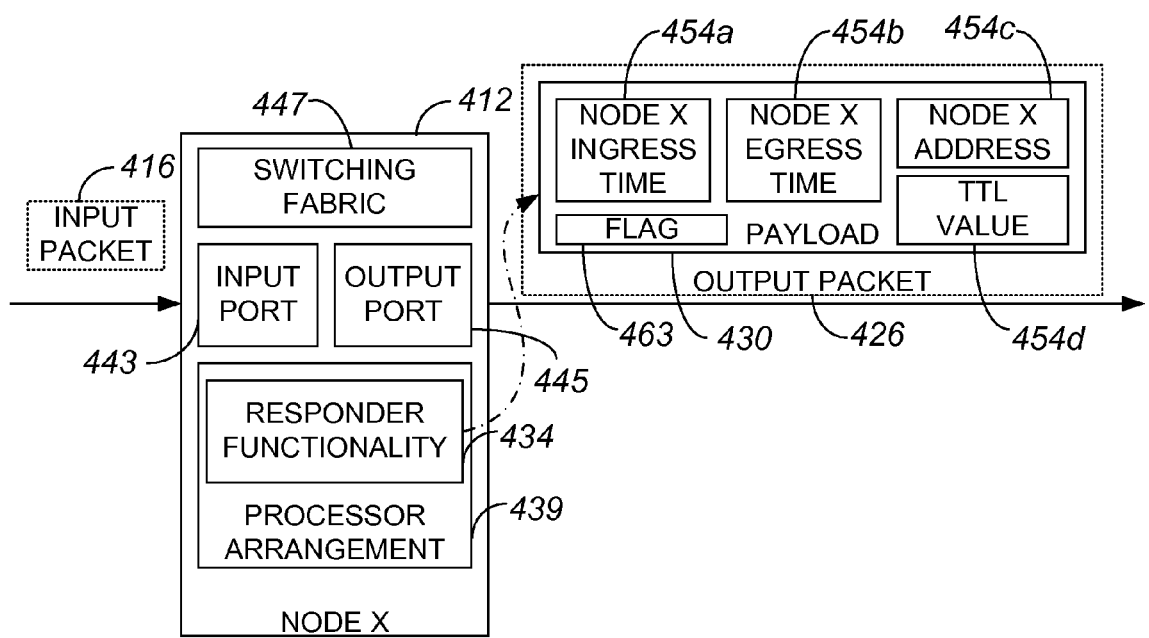
FIG. 4 is a block diagram representation of a node with responder functionality in accordance with an embodiment of the present invention.

In general, a node such as one of nodes 212a-g may be a router or include router functionality, although a node may generally be any suitable network element. FIG. 4 is a block diagram representation of a node with responder functionality in accordance with an embodiment of the present invention. A node 412 is arranged to receive an input packet 416 on an input port 443 or interface, augment input packet 416, and then transmit an output packet 426 through an output port 445 or interface. Output packet 426 is effectively an augmented or updated version of input packet 416. As will be appreciated by those skilled in the art, input port 443 and output port 445 may be provided by line cards (not shown) installed in node 412. A switching fabric 447 interconnects input port 443 and output port 445.

Output packet 426 includes substantially all information included in input packet 416, and additional information that is stored in output packet 426 by a responder functionality block 434 of a processor arrangement 439. Processor arrangement 426 is generally arranged to support a routing protocol, e.g., ECMP, and to create a forwarding table (not shown) that is used for packet forwarding. Responder functionality block 434 is arranged to identify input packet 416 as being a probe packet, and to add information 454a-d to a payload 430 of output packet 426.

Information 454a-d added by responder functionality block 434 generally includes an ingress time 434a, or an approximate time at which input packet 416 is received by input port 443. An egress time 434b written into payload 430 is an approximate time at which output packet 426 is transmitted out of output port 445. An address 434c of node 412 is stored in payload 430 by responder functionality block 434. Although address 434c is typically an IP address of node 412, address 434c may instead be a media access control (MAC) address for node 412 or substantially any identifier for node 412. In one embodiment, information 454a-d may include a TTL value 434d. TTL value 434d may be one less than a TTL value (not shown) associated with input packet 416. It should be appreciated that other types of information may generally be added.

It should be appreciated that payload 430 may also include information that is not added by node 412. By way of example, payload 430 may include ingress and egress times, as well as node addresses, for a node (not shown) that provides input packet 416 to node 412. Further, payload 430 may include a flag 463 that notifies a node (not shown) that receives output packet 426 that output packet 426 is to be substantially replicated for transmission on each segment of any equal cost path that is associated with the node (not shown). That is, flag 463 may be arranged to inform nodes with responder functionality (not shown) that output packet 426 is a probe packet that is to be augmented and transmitted on each segment of an overall equal cost path that has a segment origin at the nodes with responder functionality.

Figure 5:
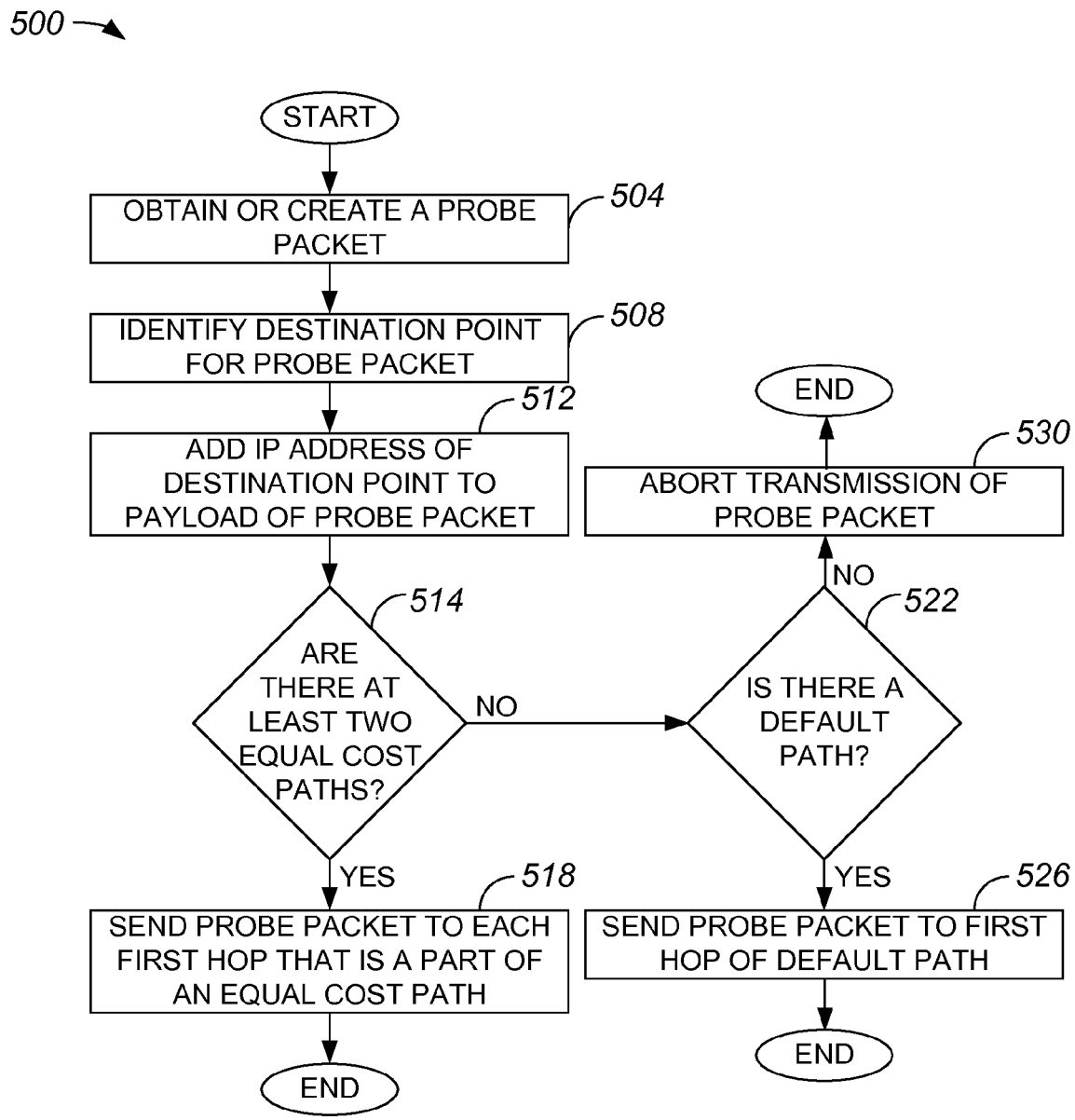
FIG. 5 is a process flow diagram which illustrates one method of processing a probe packet at a source point in accordance with an embodiment of the present invention.

With reference to FIG. 5, one method of initiating transmission of a probe packet on at least one path between a source point and a destination point will be described in accordance with an embodiment of the present invention. A method 500 of initiating transmission of a probe packet using a source point with responder functionality begins at step 504 in which the source point obtains or creates a probe packet. The source point may be a router, e.g., a router with SLA responder functionality. In one embodiment, the probe packet may be obtained from a computing system by the source point when the source point is a router. Obtaining or creating a probe packet may include augmenting a payload of the probe packet with the IP address of the source point, adding a TTL value, and/or adding a hash associated with a shared key. It should be appreciated that when the source point originates a probe packet, the IP address of the source point is typically also included in a header of the probe packet.

After the probe packet is obtained or created, a destination point for the probe packet is identified in step 508. Identifying the destination point for a probe packet may include obtaining information that pertains to the destination point from a message that is to be transmitted via the source point to the destination, or from an administrator who specifies a test destination. In one embodiment, a destination point may be derived from the routing scheme used in the network that includes the destination point. SLAs within a backbone may be established or measured between edge devices associated with a border gateway protocol BGP routing protocol. Hence, destination points may also be identified when a router probes edge devices in border gateway protocol peers.

Once the destination point for the probe packet is identified, the IP address of the destination point is added to the payload of the probe packet in step 512. A determination is then made in step 514 as to whether there are at least two equal cost paths between the source point and the destination point. Such a determination may be made using a routing table of the source point to identify hops that may be traversed by a packet when the packet is forwarded from the source point to the destination point.

If the determination in step 514 is that there is at least one equal cost path, the indication is that the probe packet is to be sent on more than one path or route to the destination point. Accordingly, the probe packet is sent on each first hop that is a part of an equal cost path in step 518. For example, referring back to FIG. 2, source point 204 may send the probe packet to both node A 212a and node E 212e. It should be appreciated that if the probe packet is replicated and sent to more than one first hop, the multiple resulting probe packets may be transmitted substantially simultaneously. The process of initiating a probe packet is completed after at least one probe packet is sent.

Alternatively, if the determination in step 514 is that there is not at least one equal cost path, process flow proceeds to step 522 in which it is determined if there is a default path between the source point and the destination point. If it is determined that there is a default path, the probe packet is sent in step 526 to the first hop in the default path. Then, the process of initiating of a probe packet is completed. If, however, it is determined in step 522 that there is no default path between the source point and the destination point, the implication is that the destination point may not be reached from the source point. As such, the transmission of the probe packet is aborted in step 530, and the process of initiating a probe packet is terminated. It should be appreciated that an error message may be generated when the transmission of the probe packet is aborted.

An intermediate node, or a node that has responder functionality and is on a path between a source point and a destination point, processes a probe packet that is received from the source point either directly or indirectly, i.e., from the source point via at least one other intermediate node. The methods used by an intermediate node to process a probe packet may vary widely. By way of example, the methods may vary depending upon whether measures are taken to prevent potential infinite looping and whether an overall network utilizes security. A method of processing a probe packet when a TTL variable is utilized to prevent potential infinite looping will be described below with reference to FIG. 7, and a method of processing a probe packet when a security key is used will be described below with reference to FIG. 8.

Figure 6:
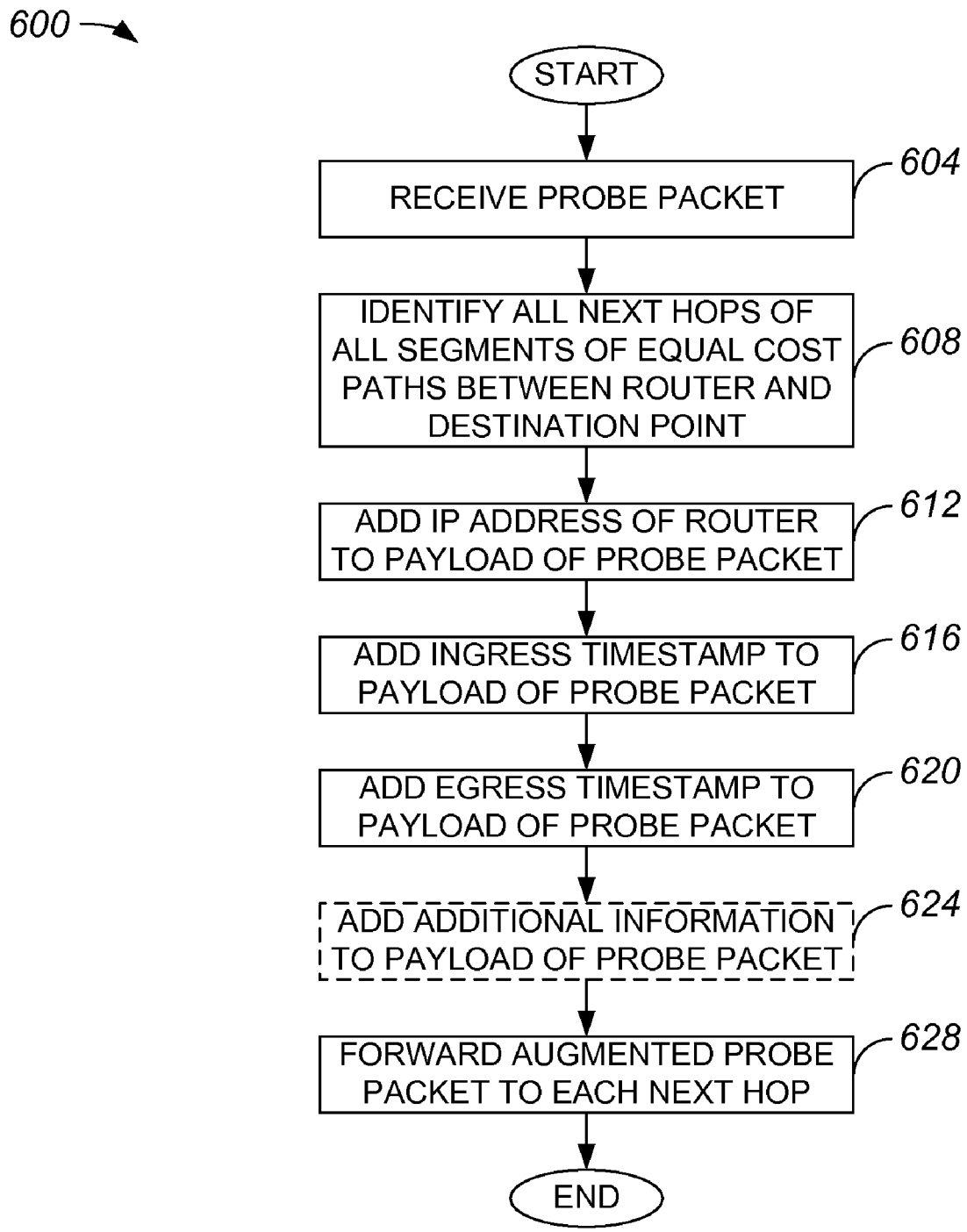
FIG. 6 is a process flow diagram which illustrates a first method of processing a probe packet at a node with responder functionality in accordance with an embodiment of the present invention.

FIG. 6 is a process flow diagram which illustrates a first method of processing a probe packet at a node with responder functionality in accordance with an embodiment of the present invention. A method 600 of processing a probe packet begins at step 604 in which the probe packet is received by a node or router with responder functionality. Once the probe packet is received, substantially all next hops of any segments of equal cost paths between the router and the destination point are identified in step 608. The equal cost paths were previously identified by a source point that initiated the probe packet.

In step 612, the IP address of the node or router is added to the payload of the probe packet. After the IP address of the router is added to the payload of the probe packet, an ingress timestamp of the probe packet is added to the payload in step 616. The ingress timestamp effectively identifies a time at which the probe packet arrived at the router. An egress timestamp, or a timestamp that indicates a time at which the probe packet is being transmitted out of the router, is added in step 620 to the payload of the probe packet. Augmenting the payload of the probe packet to include ingress and egress timestamps relative to the router effectively facilitates a determination of a processing time associated with the router, and enables any delay and jitter associated with a path to be identified. Packet loss detection may be achieved through packet numbering or sequence numbers. Alternatively, packet loss statistics associated with each hop may be determined using interface statistics collected for each router that a probe packet traverses.

Once the egress timestamp is added to the payload of the probe packet, process flow moves to optional step 624, in which additional information may be added to the payload of the probe packet. The additional information may include, but is not limited to, information regarding input and output interfaces of the router, and a TTL value. Upon adding any desired additional information to the payload of the probe packet, the probe packet is forwarded in step 628 to each next hop that was identified in step 608. After the probe packet is forwarded by the router, the processing of a probe packet is completed.

Some networks in which each node has responder functionality, routing loops may occur. As previously mentioned, to prevent excessive looping by a probe packet when the probe packet is augmented and transmitted, a TTL value may be included in a payload of the probe packet. By decrementing the TTL value each time the probe packet is augmented, eventually, the TTL value will reach approximately zero, in which case the transmission of the probe packet may be aborted. Hence, the likelihood that a probe packet would effectively loop excessively within a network is reduced.

Figure 7:
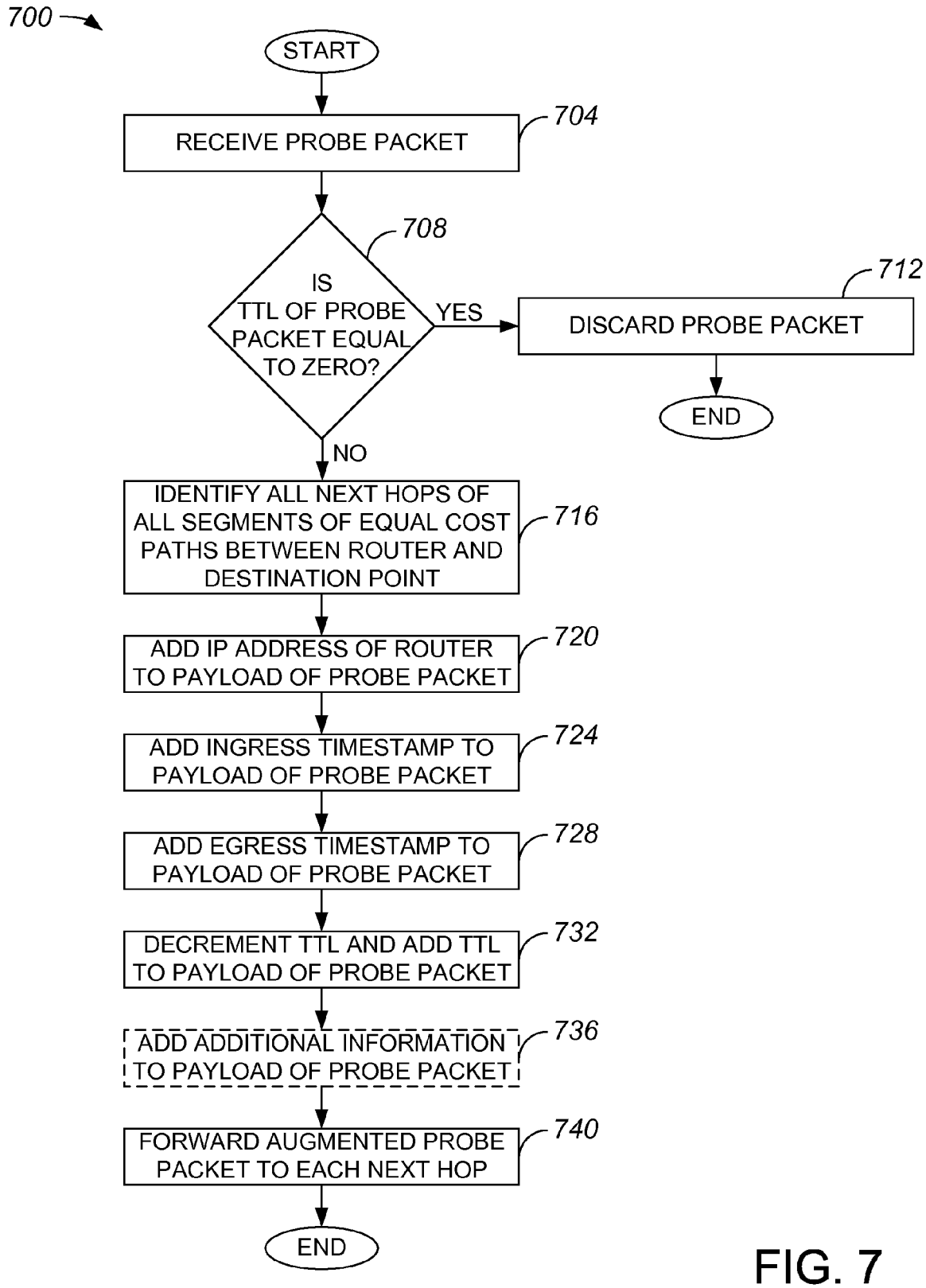
FIG. 7 is a process flow diagram which illustrates a second method of processing a probe packet at a node packet with responder functionality that includes utilizing a time-to-live (TTL) condition in accordance with an embodiment of the present invention.

FIG. 7 is a process flow diagram which illustrates a method of processing a probe packet at a node, e.g., a router, with responder functionality that includes reducing a TTL value in accordance with an embodiment of the present invention. A method 700 of processing a probe packet begins at step 704 in which the probe packet is received by a router with responder functionality. After the probe packet is received, it is determined in step 708 whether the TTL value of the probe packet is approximately equal to zero. The TTL value of the probe packet may be obtained from the payload of the received probe packet. If the TTL value of the probe packet is determined to be approximately equal to zero, the probe packet is discarded in step 712, and the processing of a probe packet is completed.

Alternatively, if it is determined in step 708 that the TTL value of the probe packet is not approximately equal to zero, then substantially all next hops of any segments of equal cost paths between the router and the destination point are identified in step 716. The equal cost paths were previously identified by a source point that initiated the probe packet.

The IP address of the node or router is added to the payload of the probe packet in step 720. Once the IP address of the router is added to the payload of the probe packet, an ingress timestamp of the probe packet is added to the payload of the probe packet in step 724, and an egress timestamp of the probe packet is added to the payload of the probe packet in step 728. As previously mentioned, adding ingress and egress timestamps to the payload of the probe packet enables delay and jitter associated with a path to be determined.

In step 732, the TTL value obtained from the payload of probe packet is decremented, and the resulting TTL value is added to the payload of the probe packet. After the TTL value is added to the payload of the probe packet, process flow moves to optional step 736, in which additional information may be added to the payload of the probe packet. The additional information may include substantially any information, e.g., information regarding input and output interfaces of the router. The probe packet is forwarded in step 740 to each next hop that was identified in step 716. The processing of a probe packet is completed once the probe packet is forwarded to each next hop.

Figure 8:
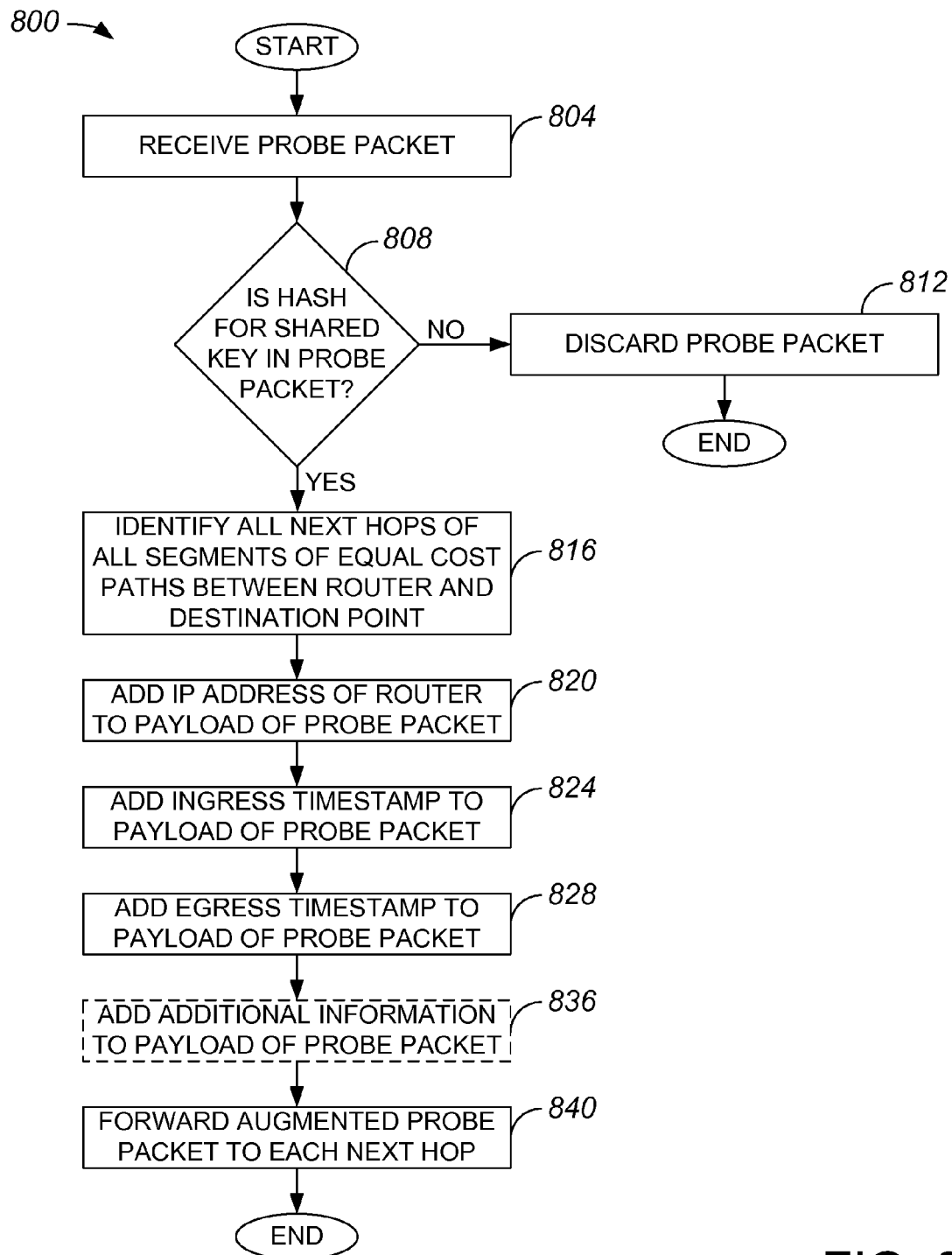
FIG. 8 is a process flow diagram which illustrates a third method of processing a probe packet at a node with responder functionality that includes processing information relating to a security key in accordance with an embodiment of the present invention.

As will be appreciated by those skilled in the art, many networks utilize security. Security is often implemented using shared keys, or keys that are shared by substantially all nodes within a network, e.g., a service provider network. In one embodiment, if a shared key is used for substantially all nodes, a probe packet will include a hash for the shared key. With reference to FIG. 8, the processing of a probe packet by a router that has responder functionality and is associated with a shared key will be described in accordance with an embodiment of the present invention. A method 800 of processing a probe packet begins at step 804 in which the probe packet is received by a router with responder functionality and a shared key. From step 804, process flow moves to step 808 in which it is determined if the probe packet contains a hash for a shared key, i.e., the shared key associated with the router. If it is determined that a hash for the shared key is not included in the probe packet, the probe packet is discarded in step 812, and the processing of a probe packet is completed.

Alternatively, if it is determined in step 808 that the probe packet includes a hash for the shared key associated with the router, then substantially all next hops of any segments of equal cost paths between the router and the destination point are identified in step 816. After the next hops are identified, the IP address of the router is added to the payload of the probe packet in step 820. Once the IP address of the router is added to the payload of the probe packet, an ingress timestamp of the probe packet is added to the payload of the probe packet in step 824. An egress timestamp of the probe packet is then added to the payload of the probe packet in step 828.

In optional step 836, additional information may be added to the payload of the probe packet. Upon adding any additional information to the payload of the probe packet, the probe packet is forwarded in step 840 to each next hop that was previously identified. The processing of a probe packet is completed once the probe packet is forwarded to each next hop.

Figure 9:
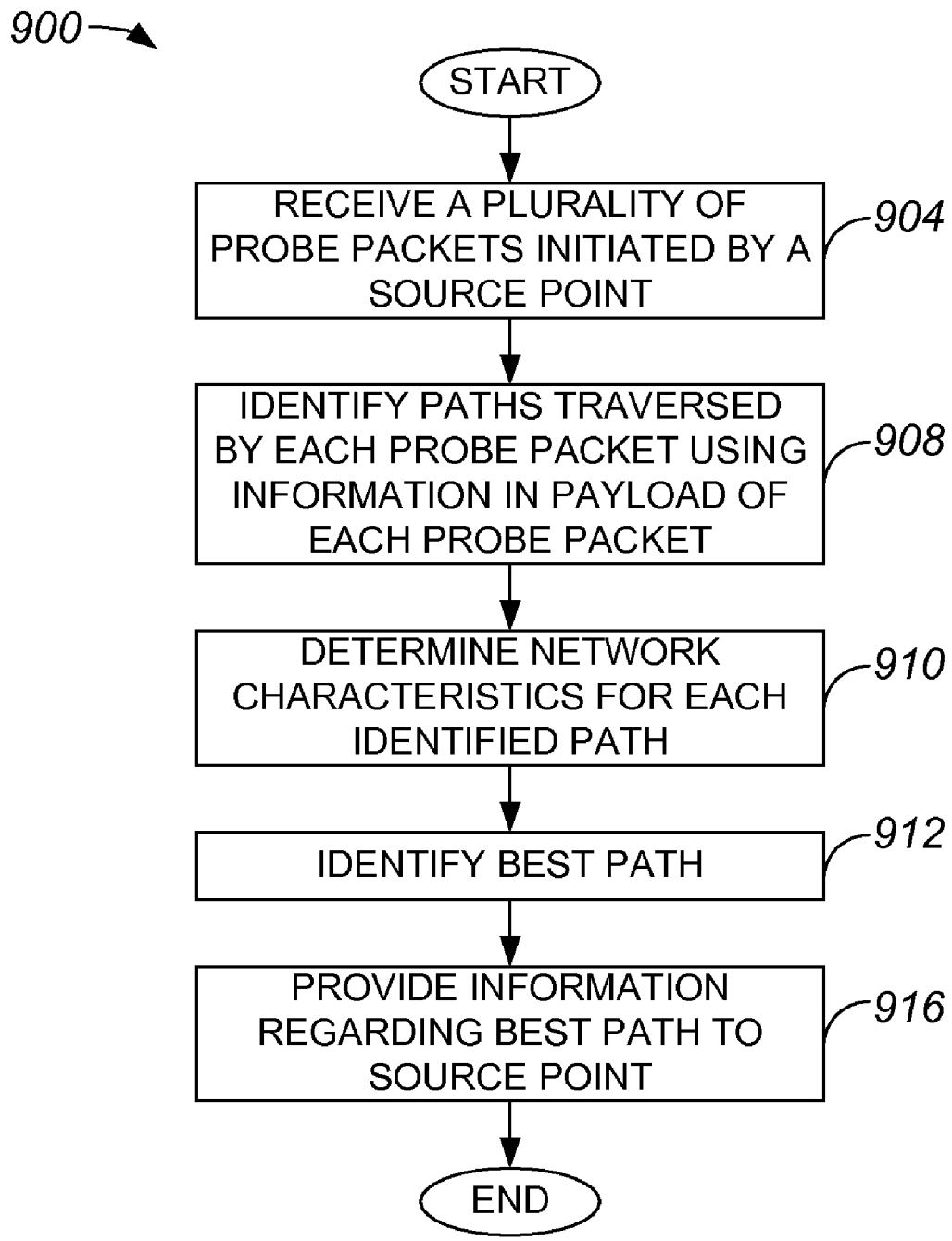
FIG. 9 is a process flow diagram which illustrates one method of processing probe packets sent on a plurality of equal cost paths to a destination point in accordance with an embodiment of the present invention.

After intermediate nodes or routers process a probe packet, the probe packet arrives at a destination point, or the intended destination of the probe packet. The destination point generally receives probe packets sent along each equal cost path between a source point and the destination point. FIG. 9 is a process flow diagram which illustrates a method of processing a plurality of probe packets received for equal cost paths at a destination point in accordance with an embodiment of the present invention. A method 900 of processing probe packets at a destination point begins at step 904 in which a plurality of probe packets initiated by a source point are received. A probe packet is received on each equal cost path. Once the plurality of probe packets are received, the paths traversed by each probe packet are identified in step 908. As the IP address of each router traversed by a probe packet is contained in the payload of the probe packet, the destination point may identify the path traversed by the probe packet by reading or otherwise reading the payload of the probe packet.

The destination point uses the information stored in the payload of each probe packet to determine network characteristics in step 910 for each of the paths for which a probe packet was received. By way of example, the destination point may use ingress and egress timestamps to determine delays or jitter associated with each path. In step 912, the destination point identifies the best path from the plurality of equal cost paths. The best path may be identified based on any suitable factor. By way of example, the performance associated with each of the equal cost paths may be used to identify the best path. After the best path is identified, the destination point provides the information regarding which equal cost path is the best path to the source point in step 916. The information may be provided to the source point, in one embodiment, when the destination point sends a message to the source point that contains the IP addresses of the routers included in the best path. However, it should be appreciated that the information may be provided to the source point using a variety of different methods. Upon providing information regarding the best path to a source point, the processing of probe packets by a destination point is completed.

It should be appreciated that once a destination point has completed processing of received probe packets, in addition to providing a source point with information regarding a best path, the destination probe may also send information regarding substantially all of the equal cost paths to the source point. By providing information regarding substantially all equal cost paths to the source point, the source point may make an informed forwarding decision.

Although only a few embodiments of the present invention have been described, it should be understood that the present invention may be embodied in many other specific forms without departing from the spirit or the scope of the present invention. By way of example, a probe packet is described as being received by a destination point for each equal cost path between a source point and the destination point. In some instances, a probe packet may not be received for a particular equal cost path due to packet loss. In other instances, a probe packet may not be received when an intermediate link or node in a path has a failure. Hence, while a destination point expects to receive a probe packet for each equal cost path between a source point and the destination point, a probe packet may generally be received for each equal cost path on which a failure has not occurred or on which packet loss has not occurred relative to the probe packet.

While the storage of timestamps and an address for each node in a path into the payload of a probe packet has been described in terms of equal cost paths, timestamps and addresses may also be stored such that any path may effectively be characterized by a destination. That is, even if there is substantially only a single path between a source and a destination and the single path is not an equal cost path of a plurality of equal cost paths, timestamps and addresses of hops associated with the single path may be stored in a probe packet.

In general, probe packets received by a node with responder functionality are updated or augmented by the node. Updating or augmenting probe packets may include either modifying the actual received probe packets or regenerating substantially new probe packets that include the information provided by a previous probe packet as well as new information.

Network characteristics that are determined using information stored in the packet of a payload have generally been described as including packet loss, delay, and jitter. The network characteristics may be substantially any characteristics. Such characteristics may include, but are not limited to, packet misordering, packet duplication, and packet corruption. Further, the information stored in the payload of a packet may include information in addition to, or in lieu of, timestamps, TTL values, addresses, interface information, and shared key information without departing from the spirit or the scope of the present invention.

Rather than utilizing a probe specific TTL mechanism, each time a router receives a probe packet, the router may extract a value from the TTL field of the IP header of the probe packet. The router may extract the value, subsequently decrement the value, and utilize the value as the TTL value of and outgoing probe packet.

Nodes which have responder functionality have been described as being routers. However, it should be appreciated that a node with responder functionality may be substantially any network element. That is, nodes that may augment the payload of a probe packet are not limited to being routers.

The present invention may be embodied at least in part as code devices or computer code which, in cooperation with processing arrangements, may be executed to enable responder functionality. Typically, responder functionality may be implemented as software, hardware, or a combination of both software and hardware.

The steps associated with the methods of the present invention may vary widely. Steps may be added, removed, altered, combined, and reordered without departing from the spirit of the scope of the present invention. By way of example, in one embodiment, prior to forwarding a probe packet, an intermediate node that has responder functionality may ascertain whether there is an appropriate path for use in forwarding the augmented probe packet to a next hop. Further, the use of a TTL value and a hash for a shared key, e.g., a hash key, may be implemented such that both the TTL value and the hash are utilized. Therefore, the present examples are to be considered as illustrative and not restrictive, and the invention is not to be limited to the details given herein, but may be modified within the scope of the appended claims.

What is claimed is:

1. A method for receiving packets at a node, the node being a destination point associated with a plurality of equal cost paths, the plurality of equal cost paths including a first path and a second path, the method comprising:

obtaining a first packet, the first packet having a first payload that includes at least one indicator that identifies at least one element traversed by the first packet along the first path, the first payload further including at least one timestamp associated with the at least one element traversed by the first packet, the at least one element including a first element, the at least one timestamp including an ingress timestamp and an egress timestamp, the ingress timestamp identifying a first time the first element received the first packet, the egress timestamp identifying a second time the first element transmitted the first packet;

determining at least one network characteristic associated with the first path, the at least one network characteristic associated with the first path being determined using the at least one timestamp associated with the at least one element traversed by the first packet;

obtaining a second packet, the second packet having a second payload that includes at least one indicator that identifies at least one element traversed by the second packet along the second path, the second payload further including at least one timestamp associated with the at least one element traversed by the second packet; and determining at least one network characteristic associated with the second path, the at least one network characteristic associated with the second path being determined using the at least one timestamp associated with the at least one element traversed by the second packet.

2. The method of claim 1 further including:

determining whether the first path or the second path is to be used for routing between a source and the node, wherein determining whether the first path or the second path is to be used includes comparing the at least one network characteristic associated with the first path with the at least one network characteristic associated with the second path.

3. The method of claim 2 further including:

providing notification to the source to use the first path for routing between the source and the node if it is determined that the first path is to be used for routing between the source and the node; and providing notification to the source to use the second path for routing between the source and the node if it is determined that the second path is to be used for routing between the source and the node.

4. The method of claim 1 wherein the at least one network characteristic is one selected from the group including a delay and jitter, the delay being determined using the ingress time and the egress time.

5. A node, the node being arranged to receive packets, the node being a destination point associated with a plurality of equal cost paths determined using a protocol that uses an equal cost multi-path (ECMP) technique, the plurality of equal cost paths including a first path and a second path, the node comprising:

means for obtaining a first packet, the first packet having a first payload that includes at least one indicator that identifies at least one element traversed by the first packet along the first path, the first payload further including at least one timestamp associated with the at least one element traversed by the first packet, the at least one element including a first element, the at least one timestamp including an ingress timestamp and an egress timestamp, the ingress timestamp identifying a first time the first element received the first packet, the egress timestamp identifying a second time the first element transmitted the first packet;

means for determining at least one network characteristic associated with the first path, the at least one network characteristic associated with the first path being determined using the at least one timestamp associated with the at least one element traversed by the first packet;

means for obtaining a second packet, the second packet having a second payload that includes at least one indicator that identifies at least one element traversed by the second packet along the second path, the second payload further including at least one timestamp associated with the at least one element traversed by the second packet; and means for determining at least one network characteristic associated with the second path, the at least one network characteristic associated with the second path being determined using the at least one timestamp associated with the at least one element traversed by the second packet.

6. A node, the node being arranged to receive packets, the node being a destination point associated with a plurality of equal cost paths determined using a protocol that implements an equal cost multi-path (ECMP) technique, the plurality of equal cost paths including a first path and a second path, the node comprising:
 an interface, the interface being arranged to obtain a first packet from the first path and to obtain a second packet from the second path, wherein the first packet has a first payload that includes at least one identifier for at least one element traversed by the first packet along the first path and at least one timestamp associated with the at least one element traversed by the first packet, and the second packet has a second payload that includes at least one identifier for at least one element traversed by the second packet along the second path and at least one timestamp associated with the at least one element traversed by the second packet, the at least one element traversed by the first packet including a first element, the at least one timestamp associated with the at least one element traversed by the first packet including a first ingress timestamp and a first egress timestamp, the first ingress timestamp identifying a first time the first element received the first packet, the first egress timestamp identifying a second time the first element transmitted the first packet, the at least one element traversed by the second packet including a second element, the at least one timestamp associated with the at least one element traversed by the second packet including a second ingress timestamp and a second egress timestamp, the second ingress timestamp identifying a first time the second element received the second packet, the second egress timestamp identifying a second time the second element transmitted the second packet; and
 a processing arrangement, the processing arrangement being arranged to determine at least one network characteristic associated with the first path using the at least one timestamp associated with the at least one element traversed by the first packet and to determine at least one network characteristic associated with the second path using the at least one timestamp associated with the at least one element traversed by the second packet.

7. The node of claim 6 wherein the processing arrangement is further arranged to determine whether the first path or the second path is to be used for routing between a source and the node by comparing the at least one network characteristic associated with the first path with the at least one network characteristic associated with the second path.

8. The node of claim 7 wherein the at least one network characteristic associated with the first path is a delay associated with the first path and wherein the at least one network characteristic associated with the second path is a delay associated with the second path.

9. The node of claim 7 wherein the at least one network characteristic associated with the first path is jitter associated with the first path and wherein the at least one network characteristic associated with the second path is a jitter associated with the second path.

10. The node of claim 7 wherein the processing arrangement is arranged to provide the source with an indication of whether the first path or the second path is to be used for routing between the source and the node.

11. A method for routing a packet using a node, the method comprising:
 obtaining the packet, the packet having a payload, the payload including an indication that the packet is a probe packet that is to be augmented and transmitted;
 adding an address of the node to the payload, wherein adding the address of the node to the payload creates an augmented packet;
 identifying at least one element to which the augmented packet is to be routed, the at least one element being identified using a routing table;
 providing the augmented packet to the at least one element;
 determining when the packet includes a hash for a shared key, wherein the at least one element to which the augmented packet is to be routed is identified when the packet includes the shared key;
 replicating the augmented packet to create a replicated augmented packet;
 identifying a second element to which the replicated augmented packet is to be routed when the packet includes the hash for the shared key, the shared key being arranged to be shared by the node, the at least one element, and the second element;
 providing the replicated augmented packet to the second element at approximately the same time the augmented packet is provided to the at least one element.

12. A node comprising:
 means for obtaining the packet, the packet having a payload, the payload including an indication that the packet is a probe packet that is to be augmented and transmitted;
 means for adding an address of the node to the payload, wherein adding the address of the node to the payload creates an augmented packet;
 means for identifying at least one element to which the augmented packet is to be routed, the at least one element being identified using a routing table;
 means for providing the augmented packet to the at least one element;
 means for determining when the packet includes a hash for a shared key, wherein the at least one element to which the augmented packet is to be routed is identified when the packet includes the shared key;
 means for replicating the augmented packet to create a replicated augmented packet;
 means for identifying a second element to which the replicated augmented packet is to be routed when the packet includes the hash for the shared key, the shared key being arranged to be shared by the node, the at least one element, and the second element;
 means for providing the replicated augmented packet to the second element at approximately the same time the augmented packet is provided to the at least one element.

* * * * *